Feb. 1, 1938.  F. C. HOLTZ  2,106,950
COMBINATION ENCLOSURE FOR ELECTRIC METERS AND PULL BOXES
Filed Jan. 19, 1935  4 Sheets-Sheet 1
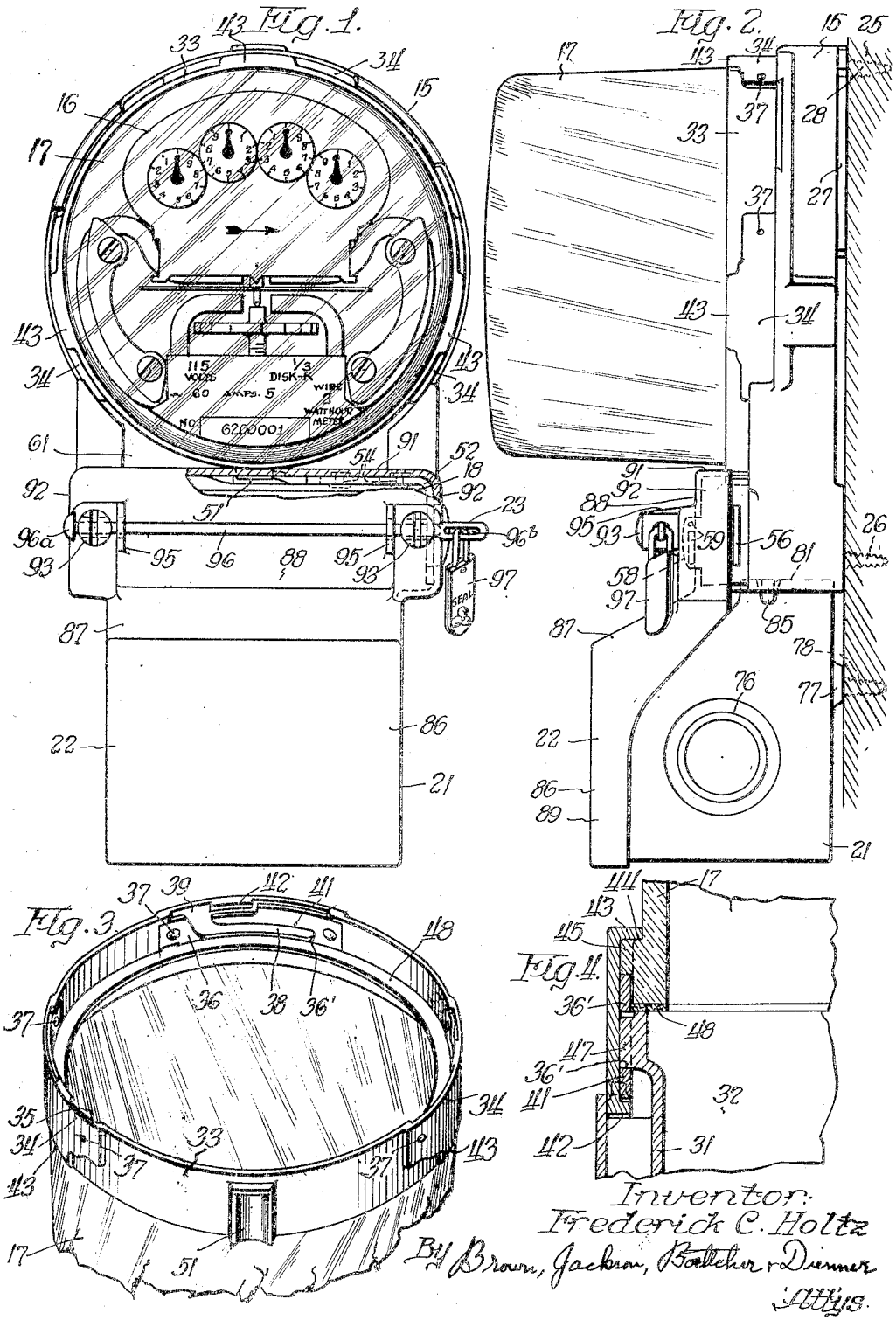
Inventor:
Frederick C. Holtz
By Brown, Jackson, Boettcher & Dienner
Attys.

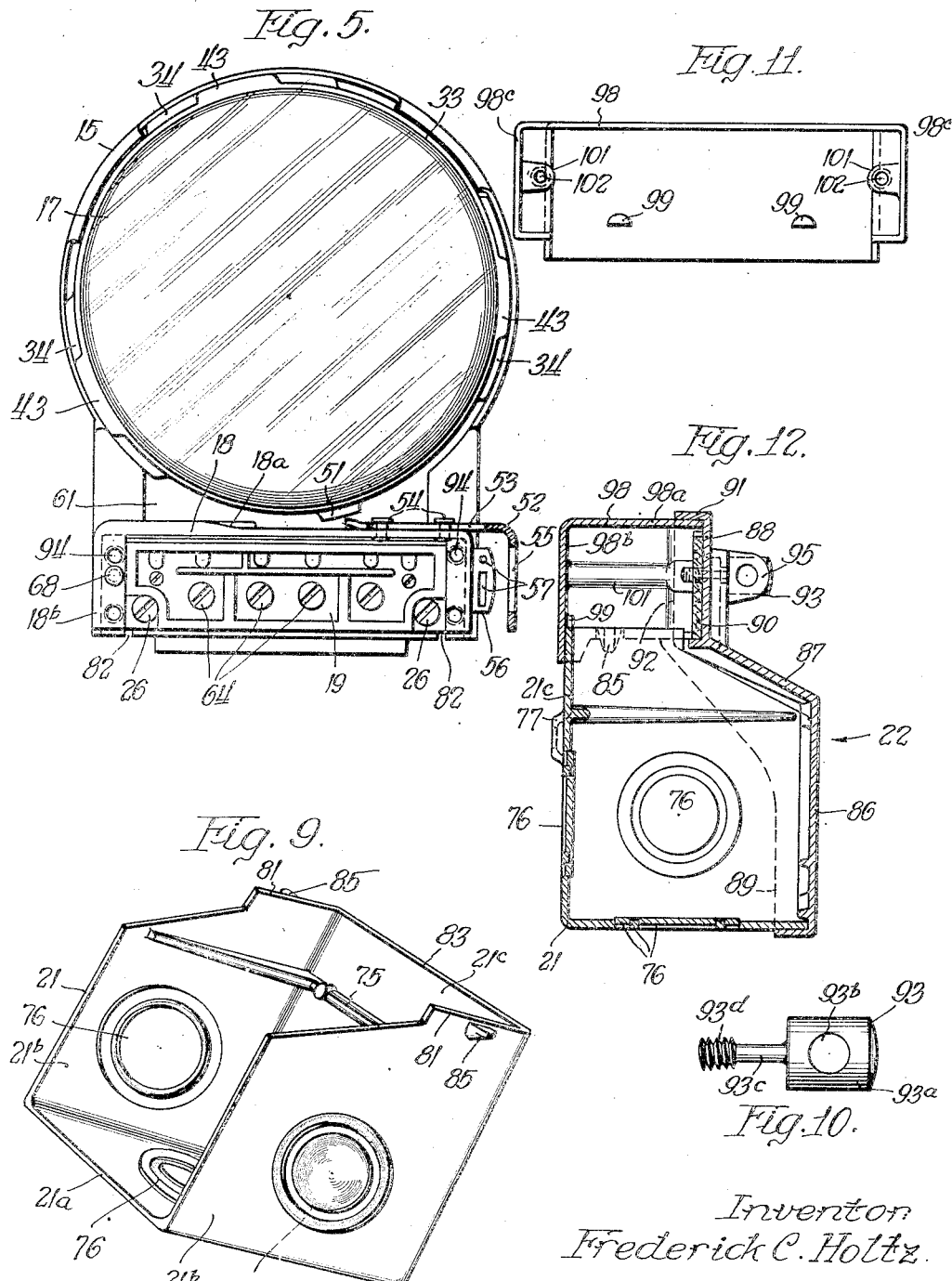

Feb. 1, 1938.   F. C. HOLTZ   2,106,950
COMBINATION ENCLOSURE FOR ELECTRIC METERS AND PULL BOXES
Filed Jan. 19, 1935   4 Sheets-Sheet 3
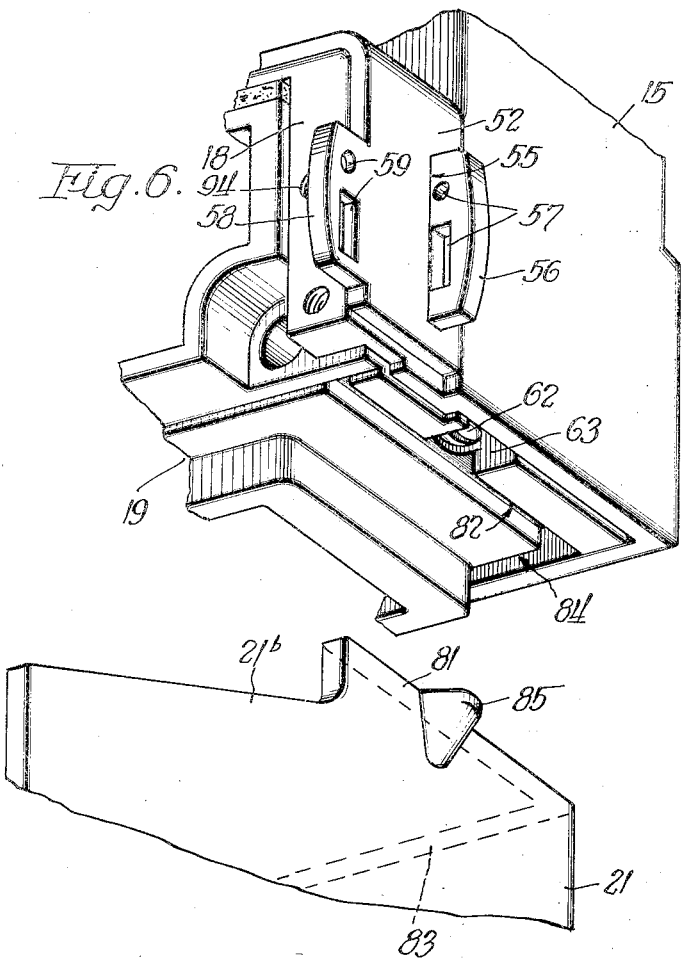
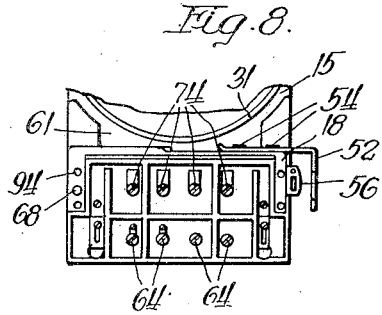
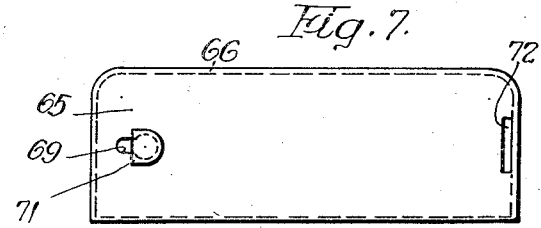
Inventor:
Frederick C. Holtz.
By Brown, Jackson, Boettcher & Dienner
Attys Feb. 1, 1938. F. C. HOLTZ 2,106,950
COMBINATION ENCLOSURE FOR ELECTRIC METERS AND PULL BOXES
Filed Jan. 19, 1935 4 Sheets-Sheet 4
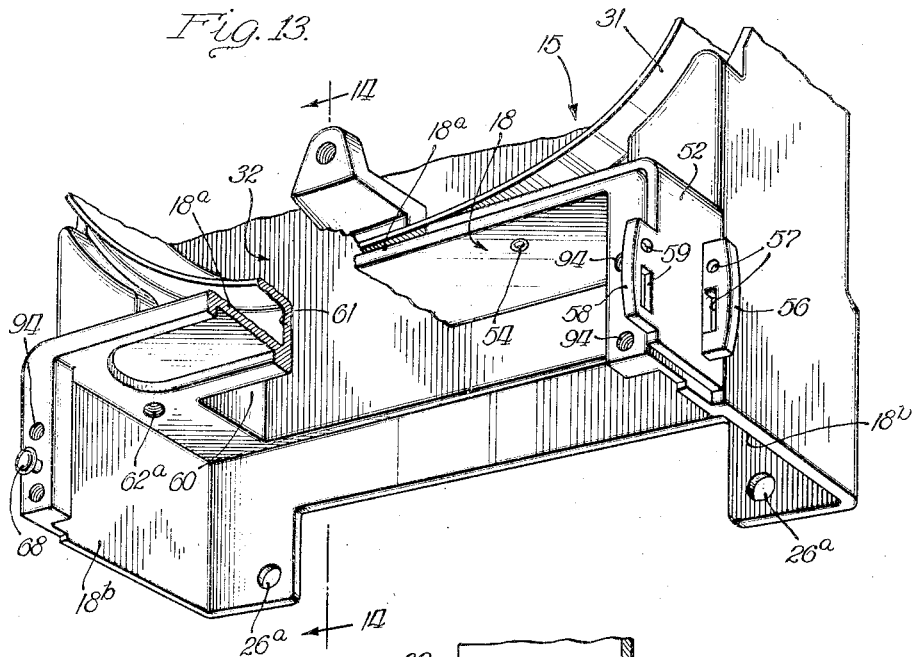
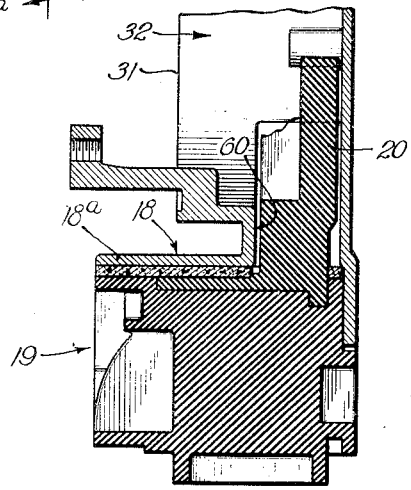
Inventor:
Frederick C. Holtz
By: Brown, Jackson, Boettcher, Dienner
Attys.

Patented Feb. 1, 1938

2,106,950

UNITED STATES PATENT OFFICE 2,106,950

COMBINATION ENCLOSURE FOR ELECTRIC METERS AND PULL BOXES

Frederick C. Holtz, Springfield, Ill., assignor to Sangamo Electric Company, Springfield, Ill., a corporation of Illinois Application January 19, 1935, Serial No. 2,462

24 Claims. (Cl. 247—2)

The present invention relates to an improved arrangement of enclosures for electric meters and pull boxes.

One of the objects of the invention is to provide an improved arrangement which will be tamper-proof so that unauthorized tampering with the service supply connections or with the meter connections cannot be done without detection.

Another object is to provide an arrangement which will be substantially weather-proof so as to make it adaptable to outdoor installations.

Another object is to provide an arrangement which will be widely flexible for substantially universal adaptability to different installation requirements and to the different preferences of public utility companies. For example, the apparatus can be installed in one combination with a standard meter provided with a conventional type of terminal block in the terminal chamber; or in a second combination with a pull box included; or in a third combination with a safety disconnect type of terminal block in the terminal chamber and no pull box; or in a fourth combination with a safety disconnect type of terminal block in the terminal chamber and provided with a pull box.

Other objects and advantages of the invention will appear from the following detail description of one preferred embodiment thereof. In the accompanying drawings illustrating this embodiment—

Figure 1 is a front elevational view, partly in section, showing one combination of meter, terminal block and pull box;

Figure 2 is a side elevational view showing this same combination;

Figure 3 is a perspective view of the inner or bottom portion of the meter cover;

Figure 4 is a detail sectional view illustrating, in transverse section, one of the bayonet joint connections between the meter cover and the main supporting base;

Figure 5 is a front elevational view, partly in section, showing the pull box and pull box cover removed, corresponding to one combination of the apparatus;

Figure 6 is a fragmentary perspective view showing the bottom and end of the terminal chamber and terminal block, and showing the upper portion of the pull box;

Figure 7 is a front view of a terminal chamber cover which may be used to enclose the terminal chamber when the pull box is not employed;

Figure 8 is a fragmentary front elevational view showing the use of a safety disconnect type of terminal block in the terminal chamber;

Figure 9 is a perspective view of the pull box;

Figure 10 is a detail view of one of the fastening screws for securing the pull box cover in place;

Figure 11 is a front elevational view of the supplementary cover for closing the top of the pull box when the meter and its mounting base are removed from service;

Figure 12 is a vertical sectional view through the pull box with the supplementary cover in place;

Figure 13 is a perspective view of the terminal block chamber in the meter base, with the terminal block removed; and Figure 14 is a section taken along the line 14—14 of Figure 13, but with the terminal block in position.

When the apparatus is assembled in the combination illustrated in Figures 1 and 2, it includes as its principal elements the following parts:—The main supporting base 15 which is secured to a suitable support, and to which base the other parts are attached; the meter 16 which is bolted to the upper portion of the supporting base 15; the glass meter cover 17 which is removably locked to the mounting base 15 to enclose the meter 16; the terminal chamber 18 which is preferably formed as an integral part of the mounting base 15, with a part of said terminal chamber projecting forwardly from the lower part of the base 15; the terminal block 19, composed of insulating material, and mounted within the terminal chamber 18, this terminal block being either with or without safety disconnects as installation conditions prescribe; the pull box 21 frequently referred to as a connection box, which extends downwardly from the terminal chamber and terminal block; the pull box cover 22 which covers the front of the pull box and also covers the front of the terminal chamber 18 and which also establishes an interlocking relation with the meter cover 17, precluding the removal of the meter cover until after the pull box cover has been removed; and the locking and sealing apparatus 23 which secures the pull box cover 22 to the mounting base 15 and seals the pull box cover against unauthorized removal.

The mounting base 15 is preferably an aluminum die casting, so as to be immune to corrosion in outdoor installations, and is suitably secured to the mounting support 25. Two mounting screws 26 (Figure 5) extend back through holes 26a (Figure 13) in the terminal block 19, where they are completely enclosed against entrance of weather; and a clip 27 secured to the back side of the mounting base at the top thereof, and arranged for vertical adjustment, has hooked engagement over the head of an upper screw 28 secured in the supporting member 25.

A circular flange 31 projects forwardly from the solid back wall of the mounting base 15 for defining a meter chamber 32 in which the meter 16 is mounted. The glass meter cover 17 has a bayonet joint locking connection with this flange 31, as best illustrated in Figures 3 and 4. A metallic ring 33, of aluminum or other non-corrosive metal, is rigidly secured around the inner edge of the glass cover 17. At angularly spaced points, this ring is formed with outwardly offset portions 34, which provide relatively long arcuate pockets or recesses 35 in the inner surface of the ring. Locking clips 36 of brass or other non-corrosive spring metal are rigidly fastened in these recesses by the rivets 37. Each clip is punched to form the bayonet slot 38 having the entering end 39, the metal beyond the slot constituting a spring tongue 41. A lug 42 projects inwardly from each portion 34 to overlie the end of the tongue and limit its outward flexing. Referring to the manner of attaching the metallic ring 33 to the glass cover, it will be seen from Figure 4 that the outer edge of the rim has an inwardly turned flange 43 which seats against a narrow annular bead 44 formed around the outside of the glass cover. At each of the locking clip locations, the cover is formed with an integral glass lug 45 projecting outwardly beyond the shoulder 44, and in assembling the construction each of these lugs is passed inwardly into an extension portion of the arcuate recess 35. Thereafter, the locking clips 36 are inserted into these recesses and riveted in place, such operation bringing the solid inner portion 36' of the clip against the back shoulder of each lug 45 and interlocking the rim 33 to the glass cover. At spaced points around the outside surface of the annular flange 31 are formed bayonet joint lugs 47. In mounting the cover on the base, the entering ends 39 of the bayonet joint slots 38 are placed in registry with the lugs 47, and thereupon the cover is pressed inwardly and then rotated to bring these lugs back into the inner end portions of the bayonet joint slots. A sealing gasket 48 is interposed between the inner edge of the glass cover 17 and the outer edge of the metallic flange 31, this gasket being compressed by the locking action and effectively sealing the meter chamber against the entrance of weather.

Attention is directed to a lug 51 which projects outwardly from the metallic rim 33 and which necessarily rotates with the cover in any operation of locking or releasing the bayonet joint connection. An interlocking slide 52 is mounted on the top surface of the terminal chamber 18 for movement into positions which either block rotation of the lug 51 or permit such rotation. The top portion of the slide 52 has a lengthwise slot 53 punched therein, and two rivets 54 extend up from the terminal chamber 18 through said slot to guide the motion of the slide, the flat heads of said rivets overlying the side margins of the slot. When the slide is pulled outwardly to the position shown in Figure 5, the inner end thereof clears the interlocking lug 51 so that the meter cover can be rotated to releasing position; when the slide is pushed inwardly to the position illustrated in Figures 1, 5 and 13 the inner end thereof abuts against the side of the lug 51 and prevents the meter cover from being rotated to releasing position. The downturned end of the slide 52 is provided with a vertical slot 55 which is adapted, when the slide is pushed inwardly, to pass over a tongue 56 projecting laterally from the side wall of the terminal chamber 18. One or more slots or openings 57 in said tongue 56 are capable of receiving sealing means or locking means for the purpose of preventing the slide from being moved to releasing position without detection. Referring to Figure 6, the downwardly extending leg of the slide is likewise provided with a similar forwardly projecting tongue 58 equipped with sealing or locking apertures 59, for a purpose which will be later described.

As best shown in Figure 13, the terminal chamber 18 is preferably cast as an integral forward extension of the mounting base 15. It is of rectangular outline, consisting of the top wall 18a (on which the interlocking slide 52 is mounted) and the two end walls 18b. The front and bottom of said chamber are open. The terminal block 19 may be molded in the form of one or more pieces of insulating material, and this terminal block unit or assembly carries the electrical terminals which establish connection between the meter, the load, and the line. The load and line wires enter the bottom of the block for connection with these terminals. A portion 20 (Figure 14) of said terminal block assembly extends upwardly from the terminal chamber 18 into the meter chamber 32 for establishing electrical connections with the meter, this portion of the terminal block extending up through a rectangular opening 60 (Figures 13 and 14) communicating between the back part of the terminal chamber 18 and the lower back part of the meter chamber 32. The front side of this opening is enclosed by a vertical wall portion 61 which extends downwardly from the annular flange 31 and joins with the top wall 18a of the terminal chamber. The terminal block is secured in the chamber 18 by two vertical screws 62 (Figure 6) which pass up through openings in the terminal block and thread into tapped holes 62a (Figure 13) in the base casting 15. When the screws 62 are in position, their heads lie at the upper ends of counterbored recesses or openings 63 (Figure 6) formed in the terminal block, these recesses or openings being also adapted to receive protecting lugs on the pull box for preventing unauthorized access to the screws, as I shall presently describe. Electrical connection between the wires and the terminal elements in the block 19 is established by the screws 64 which are accessible from the front side of the terminal block, as shown in Figure 5.

In installations where no pull box is used, as, for example, in situations where the wires are extended directly to the terminal block 19 without being enclosed in conduits, one combination of the structure may be completed by securing a cover 65 over the open front side of the terminal chamber 18, and interlocking this cover to the slide 52. This cover (Figure 7) has a top, rearwardly extending flange 66 which is adapted to lie over the top wall 18a of the terminal chamber; and said cover may also be provided with end flanges, if desired. A stud 68 projects forwardly from the lefthand end wall 18b of the terminal chamber, the head of this stud being spaced forwardly from the wall. The corresponding end of the cover 65 has a keyhole slot 69 for engaging over this stud, one end of said slot being sufficiently large to pass over the head of the stud, after which the cover can be locked to the stud by moving the cover to the right for disposing the stud in the narrow end of the slot. If desired, a small hood portion 71 may be formed over the enlarged end of the slot 69, the side of said hood toward the narrow end of the slot being open to permit the head of the stud 68 to pass toward this end of the slot. A vertical slot 72 is provided in the other end of the cover. After the key-hole aperture 69 has been engaged over the stud 68 and the cover has been drawn to the right, this righthand end of the cover can be pressed backwardly for causing the slot 72 to pass over the tongue 58 projecting forwardly from the interlocking slide 52. The slot 72 can only be passed over the tongue 58 when the slide has been pressed inwardly to its position where it blocks rotation of the interlocking lug 51. By passing locking or sealing means through one or both apertures 59, after the cover has been engaged over the tongue 58, this terminal chamber cover 65 becomes interlocked to the meter. That is to say, access to the terminal block screws 64 cannot be had until after the terminal chamber cover 65 has been removed by the releasing of the sealing or locking means engaging in the apertures 59, and access to the meter cannot be had until this cover 65 is removed for enabling the interlocking slide 52 to be moved to the right.

For some installations, it may be desirable to provide a terminal block incorporating safety disconnects. Such a terminal block is indicated at 19a in Figure 8. This type of terminal block is universally interchangeable with the other block 19 in the terminal chamber 18, the disconnect type of block 19a differing therefrom dimensionally in being slightly longer vertically so that when it is in installed position, the lower part of said block extends down slightly from the bottom of the terminal chamber 18. The details of the safety disconnect devices in this terminal block constitute no part of the present invention, it sufficing to state that these disconnects are operated by a positive differential action of the upper row of screws 74, whereby these disconnects provide a means for either disconnecting the service or for testing the meter in position. The latter type of terminal block 19a is secured in position in the terminal chamber 18 by slightly longer screws 62. In a combination employing such disconnect type of terminal block—without a pull box as a part of the combination—the terminal chamber cover 65 need only be made sufficiently wider vertically to cover both rows of screws 64 and 74, the construction and assembly otherwise remaining the same.

Referring now to combinations employing a pull box 21 as a part of the assembly, it will be observed from Figure 9 that this pull box comprises bottom, side and back walls 21a, 21b and 21c, respectively, the front and top of the box being open. This box is also preferably an aluminum die casting and may be provided with any suitable internal ribbing 75 for strengthening the construction. Annular thin portions are formed in the casting to provide the knock-outs 76 in the bottom, side and back walls for enabling conduits to be extended into the pull box either from the bottom, sides or back. Apertured bosses 77 protruding from the back wall 21c accommodate attaching screws 78 for attaching the pull box to the mounting support 25. While such fixed mounting of the pull box is desirable, it is not essential because the pull box cover 22 is capable of supporting the pull box 21 from the supporting base 15. The upper side edges 81 of the box have snug fitting engagement in rearwardly extending grooves 82 formed in the bottom of the terminal block. The transverse back edge 83 likewise has snug engagement in a transverse groove 84 formed along the back portion of the terminal block, as best shown in Figure 6, whereby a close fitting joint is established between the pull box and the terminal block. Lugs 85 project laterally from the upper edge of the box. When the box is in assembled relation to the terminal block, these lugs are disposed in the counterbored recesses or openings 63, where they cover the heads of the screws 62 and prevent removal of these screws so long as the pull box and terminal block are in assembled relation.

Referring now to the cover 22, the lower portion of this cover comprises a vertical wall 86 and a sloping wall 87 which enclose the open front of the pull box, and the top portion of said cover comprises a vertical wall 88 which encloses the front of the terminal chamber 18. A flange 89 extending rearwardly from the wall portions 86 and 87, embraces the sides and bottom of the pull box when the cover is in assembled position thereon. A sealing gasket 90 is provided on the inner side of the wall 88, and as indicated in Figure 6, the marginal flange on the front of the terminal block 19 extends slightly beyond the edges of the terminal block chamber 18, so that when the pull box cover 19 is in place the gasket 90 seals this portion of the terminal block. The upper wall portion 88 is provided with a rearwardly extending top flange 91 which overlies the top wall 18a of the terminal chamber and also overlies the top portion of the interlocking slide 52, suitable recesses being formed in the edge of this flange 91 for accommodating the heads of the rivets 54. Vertical end flanges 92 join with the lower flanges 89 and with the top flange 91. As shown in Figure 1, the righthand end flange 92 is adapted to engage over the outer side of the vertical leg of the interlocking slide 52 so as to completely enclose this slide and prevent movement thereof to releasing position when the cover 22 is in place.

The locking and sealing apparatus 23 for securing the cover 22 to the mounting base 15 comprises two screws 93 which pass through the upper corner portions of the cover. As shown in Figure 10, each screw 93 comprises an enlarged head portion 93a having a transverse aperture 93b therethrough and a conventional screw driver kerf formed in its outer end. A small shank portion 93c extends inwardly from the head portion, passing through the aperture in the cover. The threaded inner end 93d is of larger diameter than the shank portion 93c so that the screws cannot become separated from the cover and lost. The threaded portions screw into tapped holes 94 provided in the end walls 18b of the terminal chamber. The sealing gasket 90 (Figure 12) which is secured to the inner side of the wall 88 is adapted to be compressed against the edges 18a, 18b of the terminal chamber for establishing a weather-proof seal. Apertured ears 95, 95 project forwardly from the cover at points spaced inwardly from the screws 93. After the screws have been driven home, an interlocking tie rod 96 is passed through the apertures 93b in the screw heads and through the apertures in the ears 95, whereby neither screw 93 can be rotated so long as the rod 96 is in place. A head 96a on the lefthand end of the rod prevents withdrawal of the rod to the right, and a slot 96b in the other end of the rod is adapted to receive sealing or locking means 97 for preventing the undetected withdrawal of the rod to the left. It will be observed that by virtue of the interlocking relation between the several parts, the single seal 97 serves to prevent tampering in the pull box, in the terminal block and in the meter chamber. That is to say, so long as the cover 22 is sealed to the mounting base 15, no access can be had to the interior of the pull box, or to the terminal screws of the terminal block, nor can the meter cover 17 be rotated for gaining access to the meter.

In installations employing the disconnect type of terminal block 19a in conjunction with a pull box, the same pull box can have its upper edges inserted into the grooves 82, 84 of the latter terminal block as above described, the principal difference in the assembly being that a modified cover 22 would then be employed having an upper wall portion 88 of longer vertical dimension for covering the greater length of the terminal block 19a.

When it is desired to remove the meter 16 from service, as by removing it completely from the installation, the mounting base 15 is taken off the support 25 by removing the screws 26 and unhooking the upper portion of the base from the upper screw 28. The removal of the mounting base 15 removes the meter and also the terminal chamber 18 and the terminal block 19 or 19a. The pull box 21 and the cover 22 are then the only elements remaining of the original assembly. It is usually desirable to leave the line and load wires intact in the pull box, but in order to prevent unauthorized connection between the line and load wires, it is necessary that the pull box be closed and sealed. Referring to Figures 11 and 12, this is effected by a supplementary cover 98 which is arranged to close the open top of the pull box. This supplementary cover comprises the top wall 98a and a back wall 98b, the back wall extending down beyond the back wall 21c of the pull box, as shown in Figure 12. Small lugs 99 projecting inwardly from the back wall 98b seat on the transverse rear edge 83 of the pull box. The top wall 98a fits snugly under the top flange 91 of the cover 22, and the two end walls 98c of the supplementary cover fit within the end flanges 92 of the main cover 22. Ribs 101 molded along the inner sides of these side walls 98c are provided with tapped holes 102 for receiving the threaded inner ends 93d of the screws 93. When these screws are made fast, the pull box 21, main cover 22 and supplementary cover 98 are all interlocked together, with the two cover portions completely closing the pull box. Unauthorized or undetected tampering with the electrical connections within the pull box is then prevented by passing the rod 96 through the apertured screws 93 and apertured ears 95 and passing the sealing or locking means 97 through the end of said rod 96.

While I have illustrated and described what I regard to be a preferred embodiment of my invention, nevertheless it will be understood that such is merely exemplary and that numerous modifications and rearrangements may be made therein without departing from the essence of the invention.

I claim:—

1. In apparatus of the class described, the combination of a base adapted to have an electric meter mounted thereon, a meter cover for enclosing said meter, securing means for securing said meter cover to said base adapted to be released by rotation of said cover, a pull box associated with said base, a cover for said pull box, means engaged by the pull box cover when the latter is in position for precluding rotation of said meter cover to releasing position until after said pull box cover has been removed, and means for sealing the pull box cover in position.

2. In apparatus of the class described, the combination of a base adapted to have an electric meter mounted thereon, a meter cover for enclosing said meter, securing means for securing said meter cover to said base adapted to be released by rotation of said meter cover, a terminal block chamber, a terminal block disposed therein, a pull box associated with said base, a cover for covering both said pull box and terminal block chamber and a latch adapted to be embraced by said last named cover for precluding rotation of said meter cover to releasing position until after the cover for said pull box and terminal block has been moved out of engagement with said latch.

3. In apparatus of the class described, the combination of a base adapted to have an electric meter mounted thereon, a pull box adapted to be detachably connected with said base, a removable cover for said pull box, means acting between said cover and the base for securing said cover over said pull box, and means carried by said cover and engageable with the pull box and said base for preventing the separation of said pull box from said base until after said cover has been removed.

4. In apparatus of the class described, the combination of a base adapted to have an electric meter mounted thereon, a meter cover for enclosing said meter, means for attaching said meter cover to said base and enabling said meter cover to be released by the rotation thereof relatively to said base, an interlocking member movably mounted on said base adapted in one position to engage and block rotation of said meter cover to releasing position and adapted in another position to permit such rotation, a pull box associated with said base, and a cover for said pull box including means to engage and prevent movement of said interlocking member to its cover releasing position until after said pull box cover has been released.

5. In apparatus of the class described, the combination of a base adapted to have an electric meter mounted thereon, a terminal chamber associated with said base, a terminal block mounted in said terminal chamber and including means for establishing electrical connections with the meter, releasable fastening means for holding said terminal block in said terminal chamber, and a pull box separably associated with said base, said pull box being adapted to be mounted in engagement with the terminal block and carrying means overlying said releasable fastening means and serving to prevent the release thereof until after said pull box and base have been separated.

6. In apparatus of the class described, the combination of a base adapted to have an electric meter mounted thereon, a meter cover for enclosing said meter, means for attaching said cover to said base and adapted to release the cover by rotation of said cover relatively to said base, an interlocking slide movably mounted on said base and adapted in one position to block releasing rotation of said meter cover and in another position to permit such rotation, a terminal chamber in said base, a terminal block in said chamber for establishing electrical connections with the meter, a pull box associated with said terminal chamber and terminal block, a cover for said pull box and including a portion extending over said terminal chamber to serve as a cover therefor, means carried by said extending portion of the cover and engageable with the interlocking slide for preventing movement of said interlocking slide to its cover releasing position as long as said pull box cover is in position, and means for holding said pull box cover in position.

7. In apparatus of the class described, the combination of a base adapted to have an electric meter mounted thereon, a terminal chamber associated with said base, a terminal block mounted in said terminal chamber and including means for establishing electrical connections with the meter, a pull box separably associated with said base, a cover for covering said terminal chamber when said pull box is not employed, a cover for covering said terminal chamber and pull box when said pull box is employed, and means for securing either of said covers to said base.

8. In apparatus of the class described, the combination of a base adapted to have an electric meter mounted thereon, a meter cover for enclosing said meter, a terminal chamber associated with said base, a pull box adapted for optional association with said base, a cover adapted to close said terminal chamber when said pull box is not employed, a cover adapted to close said pull box and said terminal chamber when said pull box is employed, and means for establishing an interlocking relation between either of said latter covers and said meter cover for preventing the release of one of said covers until the other of said covers is released.

9. In apparatus of the class described, the combination of a base adapted to have an electric meter mounted thereon, a terminal chamber associated with said base, a terminal block mounted in said terminal chamber and including means for establishing electrical connection with the meter, a pull box seated in contact with said terminal block, and a cover for closing said pull box and reacting against said base for holding the pull box in contact with said block.

10. In apparatus of the class described, the combination of a base adapted to have an electric meter mounted thereon, a meter cover for enclosing said meter, an interlocking member mounted on said base adapted in one position to lock said meter cover against release and adapted in another position to permit release of said cover, a pull box associated with said base, a cover for said pull box, said pull box cover in its closed position adapted to overlie said interlocking member and prevent the movement of said member to its cover releasing position, a pair of screws for fastening said pull box cover to said base, said screws having apertured heads, a rod passing through said apertured heads, and sealing means for preventing undetected removal of said rod from said apertured heads.

11. In apparatus of the class described, the combination of a base adapted to have an electric meter mounted thereon, a meter cover for enclosing said meter, bayonet joint attaching means for securing said meter cover to said base enabling said meter cover to be released by the rotation thereof relatively to said base, an interlocking member movably mounted on said base adapted in one position to block rotation of said meter cover to releasing position and adapted in another position to permit such rotation, a terminal chamber defined in said base below said meter, a terminal block mounted in said terminal chamber and adapted to have electrical connection with the meter, a pull box associated with said base, a cover for covering said pull box and terminal chamber, said cover comprising means for engaging said interlocking member for preventing said member from being moved to its cover releasing position, a pair of screws for detachably securing said pull box cover to said base, said screws having apertured heads, a rod passing through said apertured heads, and sealing means for preventing the undetected withdrawal of said rod from said apertured heads.

12. In apparatus of the class described, the combination of a base adapted to have an electric meter mounted thereon, a meter cover for enclosing said meter, a terminal block chamber formed in said base, a terminal block disposed in said chamber, screw means securing said terminal block therein, a pull box associated with said base and having lugs overlying said screw means so as to prevent removal of the latter so long as the pull box is in position, a cover for said pull box engageable with the latter and said base for locking the pull box in position, and means for interlocking said meter cover and pull box cover to said base.

13. In apparatus of the class described, the combination of a base adapted to have an electric meter mounted thereon, a terminal chamber formed in said base and having a flange portion, a terminal block disposed in said chamber, a pull box having its side and top open, said terminal block having means to receive the top of said pull box, and a pull box cover adapted to close said pull box and having portions engaging the latter and the flange of said terminal chamber for locking the pull box in position.

14. In apparatus of the class described, the combination of a base adapted to have an electric meter mounted thereon, a pull box having an open front and top, a terminal block chamber formed in said base, a terminal block mounted therein, said chamber having an open front and said terminal block having means to receive the open top of said pull box, and a pull box cover having one portion embracing and closing the front of the pull box and another portion sealing the terminal block chamber and engaging the latter to hold the pull box in position relative to the base.

15. In apparatus of the class described, the combination of a base adapted to have an electric meter mounted thereon, a meter cover for enclosing said meter, a terminal block chamber formed in said base and including a flange, means movably carried by the latter for locking the meter cover in place, a pull box separably associated with said base, and a pull box cover having a portion embracing the pull box and a portion closing the terminal block chamber and overlying the flange thereof and the locking means for said meter cover, whereby when the pull box cover is in position, both the pull box and the meter cover are locked against removal.

16. In apparatus of the class described, the combination of a base adapted to have an electric meter mounted thereon, a meter cover for enclosing said meter, a terminal block chamber formed in said base and having open front and bottom portions, a terminal block disposed in said chamber having a section disposed in the open front portion of the terminal block chamber, means carried by one wall of said terminal block chamber for preventing the removal of said meter cover, and a second cover adapted to be disposed over the open front portion of said terminal block chamber and arranged to engage said means so as to lock said meter cover in place, said second cover having means sealing said portion of the terminal block when said second cover is in place over the front of said terminal block chamber.

17. In apparatus of the class described, the combination of a base adapted to have an electric meter mounted thereon, said base comprising a casting having a flange defining a meter receiving compartment and a hollow portion defining a terminal block chamber, the latter and said meter receiving compartment being in communication, a meter cover for enclosing said meter and adapted to be removably mounted on said flange, said terminal block chamber having its bottom and front portions open, terminal block means disposed in said chamber and including a section disposed in said front opening and another section extending into said meter compartment, a meter cover locking member slidably mounted on said terminal block chamber, and a cover member adapted to close off the front of said terminal block chamber so as to prevent access to the first mentioned section of said terminal block means, said cover having means embracing said slidable member so as to prevent access thereto so long as the cover member is in position.

18. In apparatus of the class described, the combination of a base adapted to have an electric meter mounted thereon and having an integral terminal block chamber formed with open bottom and front portions, a terminal block disposed in said chamber and having front and bottom portions disposed in the corresponding openings in said chamber, the bottom portion of said terminal block having grooves formed in the end and back sections thereof, a pull box separate from said base and having portions adapted to be received in said grooves, and a pull box cover having flanged portions embracing said pull box and the front portion of said terminal block chamber for closing the front portion of the latter and holding said pull box in position in said grooves.

19. In combination, an electrical device, a connection box therefor, and a common cover, said device having a separate chamber for electrical mechanism with an individual removable cover and movable cover locking means therefor, and having at one end a terminal chamber open on two adjacent sides, said cover locking means having a projection fitting against the edge of said terminal chamber when said separate cover is in locked position and movable away from the edge of said terminal chamber for unlocking said separate cover, said connection box also being open on two adjacent sides, said device being mounted against said box with an open side of one against and closing an open side of the other and the two remaining open sides facing the same way, said common cover being adapted to fit over said remaining open sides and over said locking means projection and to be sealed in position, thereby closing said terminal chamber and connection box and sealing both chambers of said device as well as said connection box.

20. In combination, an electrical device and a connection box therefor, and a common cover, said device having a separate chamber for electrical mechanism with an individual removable cover and movable cover locking means therefor and having an open terminal chamber, said cover locking means having a projection fitting against the edge of said terminal chamber when said separate cover is in locked position and movable away from the edge of said terminal chamber for unlocking said separate cover, said connection box also being open and being mounted adjacent said terminal chamber so that both open in the same direction, said common cover being adapted to fit over said terminal chamber and connection box and over said locking means projection and to be sealed in position, thereby closing said terminal chamber and connection box and sealing both chambers of said device as well as said connection box.

21. In combination, a connection box of the type adapted to be associated with an electrical device to accommodate electrical connections therebetween, said box having two adjacent side openings one of which is adapted to register with a terminal receiving opening of such associated electrical device, an auxiliary cover for the last mentioned opening of said box to be used when such electrical device is removed, said auxiliary cover being in the shape of a six-sided three-dimensional figure simulating a terminal chamber of an electrical device and being open on two adjacent sides, said box and auxiliary cover being mounted together with an open side of one against and closing an open side of the other, and the two remaining open sides facing the same way, and a common cover adapted to fit over and close said remaining open sides.

22. In combination, a connection box of the type adapted to be associated with an electrical device to accommodate electrical connections therebetween, said box having two adjacent side openings one of which is adapted to register with a terminal receiving opening of such associated electrical device, an auxiliary cover for the last mentioned opening of said box to be used when such electrical device is removed, said auxiliary cover also having two adjacent side openings, the wall adjacent one of said openings being provided with positioning lugs for determining the relative position of the connection box and auxiliary cover when the latter is mounted on the connection box with the open side of one against and closing the open side of the other, and a common cover adapted to fit over and close the remaining open sides of the auxiliary cover and connection box.

23. In apparatus of the class described, the combination of a base adapted to have an electric meter mounted thereon, a meter cover for enclosing said meter, a terminal block disposed in a portion of said base, a pull box associated with the base and arranged to prevent access to a portion of said terminal block, a second cover for covering said pull box and the remainder of said terminal block, and means for locking the meter cover in place so long as said second cover is in place over said pull box and terminal block.

24. In apparatus of the class described, the combination of a base adapted to have an electric meter mounted thereon, a meter cover for enclosing said meter, securing means for securing said meter cover to said base adapted to be released by rotation of said cover, a pull box associated with said base, a cover for said pull box, a releasable latch to preclude rotation of said cover, and means on the pull box cover engaging said latch and actively holding the same in a position preventing removal of the meter cover until the pull box cover has been removed.

FREDERICK C. HOLTZ.